United States Patent
Eguchi

[11] Patent Number: 6,114,966
[45] Date of Patent: Sep. 5, 2000

[54] MOTOR HAVING A BEARING WEAR MONITORING DEVICE

[75] Inventor: Masaaki Eguchi, Saitama, Japan

[73] Assignee: Nikkiso Co., Ltd., Japan

[21] Appl. No.: 09/181,176

[22] Filed: Oct. 28, 1998

Related U.S. Application Data

[63] Continuation-in-part of application No. 08/923,023, Sep. 3, 1997, Pat. No. 5,926,001.

[51] Int. Cl.$^7$ ..................................................... G08B 21/00
[52] U.S. Cl. ......................... 340/682; 73/119 R; 73/462; 340/648; 340/686.1; 340/686.3
[58] Field of Search ................................. 340/682, 686.1, 340/686.3, 648; 73/462, 119 R

[56] References Cited

U.S. PATENT DOCUMENTS

| | | | |
|---|---|---|---|
| 3,981,621 | 9/1976 | Considine | 340/682 |
| 4,334,189 | 6/1982 | Sato | 340/648 |
| 4,539,499 | 9/1985 | Punch et al. | 340/648 |
| 4,584,865 | 4/1986 | Hutchins | 340/682 |
| 5,805,080 | 9/1998 | Lemoine et al. | 340/683 |

*Primary Examiner*—Jeffery A. Hofsass
*Attorney, Agent, or Firm*—Morrison Law Firm

[57] ABSTRACT

A motor is provided in which zero-point positioning of the stator and rotor in the axial direction is simple. The operation of replacing the rotor or stator can be done easily. A motor is provided in which zero-point positioning of the stator and rotor in the axial direction is simple and the detection precision can be improved. In a canned motor, a bearing wear monitoring device monitors the wear of the bearings that supports the rotor. The wear of the bearings is determined by measuring the displacement of the rotor based on the output signal of detection coils that are provided in embedding core units on both axial ends of the stator. The center of the embedding core unit at one axial end of the stator and the end face of one axial end of the stator are positioned to coincide with one another. The other axial end of the rotor is made to protrude outside the embedding core unit of the other axial end of the stator by a prescribed dimension. The output voltage of the detection coil at the other axial end is kept to a constant value. The detection coils at the axial ends of the stator produce a differential output voltage corresponding to the wear of the bearings.

3 Claims, 8 Drawing Sheets

MOTOR HAVING A BEARING WEAR MONITORING DEVICE

This is a Continuation-In-Part of U.S. patent application Ser. No. 08/923,023 filed Sep. 3, 1997, which issued on Jul. 20, 1999 as U.S. Pat. No. 5,926,001.

BACKGROUND OF THE INVENTION

The present invention relates to a motor, in particular a motor that has a bearing wear monitoring device. The monitoring device monitors the wear of the bearings that support the rotor, caused by the displacement of the rotor.

Canned motors, also referred to as sealed motors, are used in plants that require high reliability. The bearings of a canned motor wear from use and must be monitored to prevent damage to the motor. It is essential to have a bearing wear monitoring device to monitor the wear of the bearings that support the rotor. A conventional bearing wear monitoring device of the prior art is shown in FIGS. 13 and 14.

The conventional bearing wear monitoring device has a pair of detection coils 103a and 103b as shown in FIGS. 13 and 14. The coils 103a and 103b are attached to the iron core teeth of a stator 102. The coils run along the entire circumference of the teeth in the longitudinal direction (the axial direction). The coils are separated apart by 180 degrees and are connected to produce a differential output voltage which is read and monitored by a voltmeter 104.

A rotation of the rotor 105 causes a voltage to be induced in the detection coils 103a and 103b. The higher-harmonic voltage due to rotor-groove 105a is superimposed on the fundamental-harmonic voltage that is synchronized with the frequency of the power source. Since the outputs of detection coils 103a and 103b are separated by 180 degrees and are interconnected to produce a differential output, the fundamental-harmonic voltage is canceled out at the voltmeter 104. Thus the voltmeter 104 detects and displays only the difference of the instantaneous values of the higher-harmonic voltages. When a bearing in a motor becomes worn, the gaps d1 and d2 between stator 102 and rotor 105 are caused to change. Therefore, the voltage displayed on the voltmeter 104, due to the higher-harmonic voltage of detection coils 103a and 103b, corresponds to the changes in gaps d1 and d2 which is the effect of a worn bearing.

The bearing wear monitoring device of the prior art can only monitor (detect) the bearing wear in the radial direction that is caused by radial (axial) displacement of rotor 105. The prior art device cannot monitor the bearing wear in the axial direction (thrust direction). In a canned motor of this type, the load of rotor 105 on the rotor shaft and the direction of wear on the bearing vary with the nature and pressure of the fluid that is being transported. Thus, there is a need to detect non-directional bearing wear, a requirement which this bearing wear monitoring device cannot meet.

To address the drawbacks of the prior art, the applicant filed Japanese patent application 08-236483, on Sep. 6, 1996, for a canned motor equipped with the type of bearing wear monitoring device shown in FIGS. 10–12. As shown in FIG. 10, the bearing wear monitoring device in this canned motor has a total of eight detection coils C1–C8 provided in pairs positioned 180 degrees apart on both ends of the axial (longitudinal) direction of stator 52.

As shown in FIG. 11, a detection circuit 54 is provided for detecting wear of the bearing in the axial direction. Facing pairs of detection coils C2, C4 and C6, C8, from FIG. 10, are connected in series. The series connected coils are wired to a filter 59. The filter 59 provides a filtered signal output to the amplifier 58. Amplifier 58 provides gain to the measured signal from the coils through the filter to drive the indicator 53 with a differential signal. The differential signal connected to the indicator 53 corresponds to the wear of the bearing in the axial direction.

Referring now to FIGS. 12, a detection circuit 56 is provided for detecting wear of the bearing in the radial direction. Opposing pairs of series connected detection coils C1, C3 and C5, C7 are series connected to diodes 55. Each set of series connected diode 55 and series connected coils are connected together in parallel providing a differential output signal. Amplifier 58 provides gain to the differential output signal and drives indicator 53 with the gained differential signal. The gained differential signal connected to the indicator 53 corresponds to the wear of the bearing in the radial direction.

The conventional wear monitoring device shown in FIGS. 10–12 monitors wear of the bearing in both the axial and radial direction. The axial direction of the bearing is detected by detection circuit 54, and wear in the radial direction, including the oblique direction, is detected by detection circuit 56. Thus it is possible to monitor the state of wear of the bearing non directionally.

The above described bearing wear detection device can detect wear of the bearing both radially and axially, and can monitor bearing wear with good precision. However, it has been found through subsequent experimentation that the detection device has great difficulty in adjusting the zero point in the axial direction. The zero point is adjusted by positioning the stator 52 and a rotor not shown in the axial direction.

For example, if the bearing becomes worn due to use of the canned motor, either the rotor or stator 52, or both, must be replaced. However, when the rotor or stator 52 of an existing canned motor is replaced, it is in practice impossible to control the dimensions between the part that is replaced and the part that is not replaced. Unless stator 52 and the rotor are manufactured as a pair, their widths assembled into the canned motor cannot be controlled as was done when they were first manufactured.

When a part is replaced, care must be taken to ensure that the parts are within the prescribed dimensional displacement in the axial direction with respect to the non-replaced part. If one of the two parts shifts with respect to the other, then the voltage of the detection coils will change significantly. For Example, a replacement-part the rotor shifts in either axial direction in an attempt to adjust this displacement mechanically. This in turn causes the output voltage of detection coils C2 and C4 and detection coils C6 and C8 on both axial ends of stator 52 to change.

It is a very difficult operation to achieve agreement between the mechanical positioning (zero-point adjustment) of the rotor and stator 52 and the electrical zero-point adjustment of the bearing wear monitoring device. In practice the zero point of the bearing wear monitoring device is matched to the mechanical zero point by means of an electrical process such as adjustment of the gain of the detection circuits 54 and 56. The operation of adjusting the zero point of the bearing wear monitoring device by positioning stator 52 and the rotor is very involved and difficult. This zero point adjustment is a problem not only when stator 52 or the rotor 57 is replaced or repaired, but also when stator 52 and the rotor are assembled in the manufacturing stage.

OBJECTS AND SUMMARY OF THE INVENTION

Accordingly, an object of the present invention is to provide a motor having a bearing wear monitoring device that overcomes the drawbacks and limitations of the prior art.

Another object of the present invention is to provide a motor in which zero-point adjustment of the stator and rotor in the axial direction is simple.

It is a further object of the present invention to provide a motor in which the replacement of the stator or rotor can be done easily.

It is a still further object of the present invention to provide a motor having an improved detection precision.

It is a still further object of the present invention to provide a motor having a zero-point adjustment of the stator and rotor in the axial direction that is easy to adjust.

Briefly stated, a motor is provided in which zero-point positioning of the stator and rotor in the axial direction is simple. The operation of replacing the rotor or stator can be done easily. A motor is provided in which zero-point positioning of the stator and rotor in the axial direction is simple and the detection precision can be improved. In a canned motor, a bearing wear monitoring device monitors the wear of the bearings that supports the rotor. The wear of the bearings is determined by measuring the displacement of the rotor based on the output signal of detection coils that are provided in embedding core units on both axial ends of the stator. The center of the embedding core unit at one axial end of the stator and the end face of one axial end of the stator are positioned to coincide with one another. The other axial end of the rotor is made to protrude outside the embedding core unit of the other axial end of the stator by a prescribed dimension. The output voltage of the detection coil at the other axial end is kept to a constant value. The detection coils at the axial ends of the stator produce a differential output voltage corresponding to the wear of the bearings.

In accordance with these and other objects of the invention, there is provided a bearing wear monitoring device for use in a motor, comprising: a stator having a first end and a second axial end, detection coils provided on each of the first axial end and the second axial end of said stator, the detection coils effective to provide an output signal; means for detecting the output signal, a rotor having a rotor shaft with a front portion and a rear portion, the front portion and the rear portion of the rotor shaft being supported by a front bearing and rear bearing, respectively, the rotor being in a relative position within the stator, the relative position being within a prescribed dimension between the rotor shaft and the stator, such that the output signal of the detection coils is effective to indicate an amount of displacement from the prescribed dimension.

According to a feature of the invention, there is provided a bearing wear monitoring device for use in a motor, further comprising: the rotor having a first axial end and second axial end, an embedding core unit provided at each of the first axial end and the second axial end of the stator, the detection coils being provided in the embedding core units at each axial end of the stator, the first axial end of the rotor being positioned such that the first axial end of the rotor is positioned in a prescribed position relative to the first axial end of the stator, and the second axial end of the rotor being positioned such that the second axial end of the rotor is positioned a prescribed dimension outside of the embedding core unit of the second axial end of the stator.

According to yet another feature of the present invention, there is provided a bearing wear monitoring device for use in a motor, comprising: a stator having a first axial end and a second axial end, at least one pair of first detection coils connected in series being provided on the first axial end of the stator, each of the at least one pair of first detection coils facing each other with a separation of 180 degrees, the at least one pair of first detection coils effective to produce a first output signal, at least one pair of second detection coils connected in series being provided on the second axial end of the stator, each of the at least one pair of second detection coils facing each other with a separation of 180 degrees, the at least one pair of second detection coils effective to produce a second output signal, means for maintaining one of the first output signal and the second output signal at a constant value, the at least one pair of first detection coils and the at least one pair of second detection coils being connected differentially to provide a differential output signal, means for detecting the differential output signal, a rotor having a rotor shaft, the rotor shaft being supported by at least one bearing, the rotor being in a relative position within the stator, the relative position being within a prescribed dimension between the rotor shaft and the stator, such that the differential output signal indicates an amount of relative displacement from the prescribed dimension.

By such a composition, axial positioning of the stator and rotor is done at one end of the stator and rotor; for example, the end face of the rotor is made to coincide with the center of the embedding core unit of the detection coil at one axial end of the stator. Also, the other end of the stator and rotor is set so that, for example, the end face of the other end of the rotor protrudes a prescribed dimension axially outward from the embedding core unit of the other axial end of the stator, and the output of the detection coil embedded in the embedding core unit is kept constant. By keeping the output of the detection coil at the other end of the stator constant, axial positioning of the stator and rotor can be done with the detection coil at the other axial end of the stator, facilitating the zero-point adjustment of stator and rotor.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a sketch of the internal structure of a bearing wear detection device as applied to a canned motor.

FIG. 2 is a rough perspective view of the stator showing the positions of the detection coils.

FIG. 3 is a decomposed perspective view of the main parts showing how the detection coils are installed.

FIG. 4 is an enlarged view of part A in FIG. 1.

FIG. 5 is an enlarged view of part B in FIG. 1.

FIG. 6 is a circuit diagram of the detection circuit that detects axial radius displacement of the rotor.

FIG. 7 is a diagram of the voltage waveforms of the detection coils when the rotor becomes displaced in the axial radius direction.

FIG. 8 is diagram of the voltage waveforms of the detection coils when the rotor is displaced axially.

FIG. 9 is a diagram of the voltage waveforms of the detection coils when the rotor becomes displaced axially.

DETAILED DESCRIPTION OF THE PREFERRED EMBODIMENT

Figure 1:
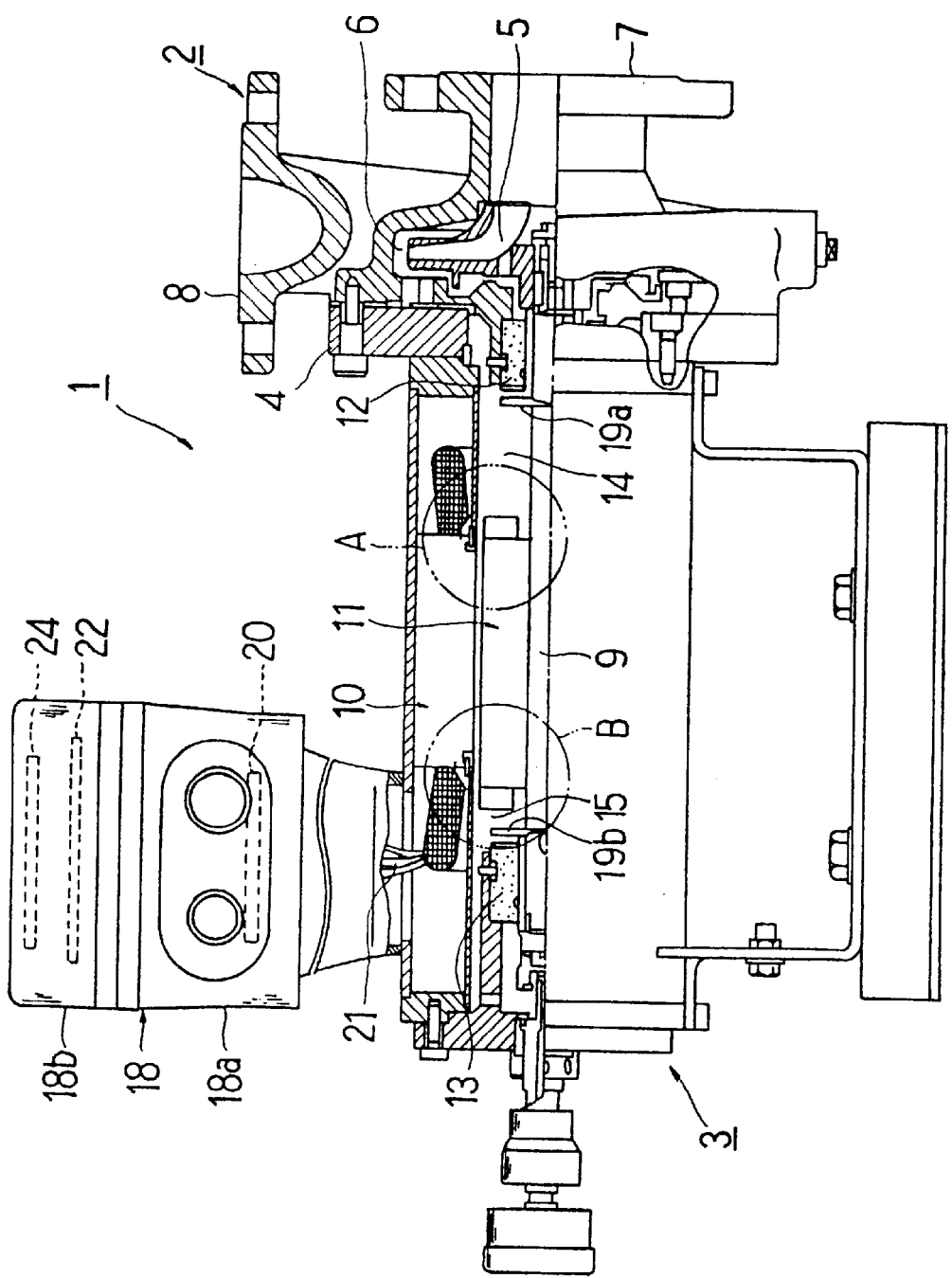
FIGS. 1–9 show an embodiment of the bearing wear detection device as applied to a canned motor apparatus.

A canned motor 1 is shown in FIG. 1. Canned motor 1 is configured to act as a motor. Canned motor I has pump unit 2 and a canned motor unit 3, which are made mutually interchangeable and are connected with each other by front bearing housing 4. Pump unit 2 has suction intake pipe unit 7 and discharge pipe unit 8 which are joined within pump chamber 6. Pump chamber 6 is equipped with impeller 5 which is attached to an extension end of rotor shaft 9 of canned motor unit 3. Canned motor unit 3 has stator 10 and rotor 11. Rotor shaft 9 of rotor 11 is supported by bearing 12 on the front side and bearing 13 on the rear side. Front rotor chamber 14 and rear rotor chamber 15 are formed on the two ends of rotor 11.

Some treatment fluid is introduced into rear rotor chamber 15 from discharge pipe unit 8 of pump unit 2 by an external conduit (not shown). This treatment fluid lubricates bearing 13 and cools canned motor unit 3. Inside front bearing housing 4 is a fluid path that joins front rotor chamber 14 and the low-pressure side of pump unit 2. This fluid path communicates with front rotor chamber 14 causing the treatment fluid to lubricate bearing 12 and cool canned motor unit 3.

Canned motor 1 has thrust washers 19a and 19b provided axially outside rotor 11 in positions facing the end faces of bearings 12 and 13 with the prescribed spacing. Bearing wear monitoring device 18 is installed in an upright state on the outer circumference of the end of canned motor unit 3, on the side of canned motor 1 that is opposite pump unit 2.

Bearing wear monitoring device 18 consists of terminal box 18a and cover 18b. Cover 18b provides a cover for the opening on the top of terminal box 18a. Inside terminal box 18a is terminal panel 20. Terminal panel 20 connects electric wire 21 from the interior of canned motor unit 3 to the outside and to printed circuit board 22 inside cover 18b. Indicator 24 is mounted to the printed circuit board 22 and placed inside cover 18b. Indicator 24 consists of detection circuit 23, FIG. 6 which processes the detection signals of detection coils C1–C8 explained below, and a voltmeter. The voltmeter indicates the output signal of this detection circuit 23.

Figure 2:
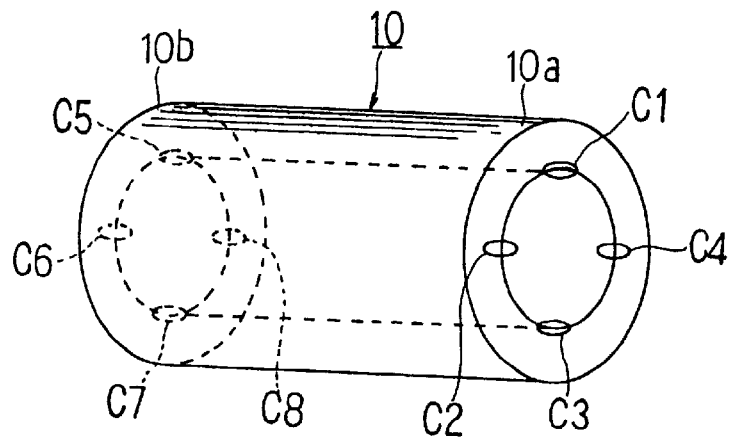

As shown in FIGS. 2, detection coils C1–C8 are positioned facing each other on both axial ends of stator 10 with a separation of 180 degrees. Detection coils C1, C3, C5, C7 detect the radial displacement of rotor 11. Detection coils C2, C4, C6, C8 detect the axial displacement of rotor 11. These detection coils C1–C8 are formed by turning winding wire a prescribed number of times around a flat bobbin.

Figure 3:
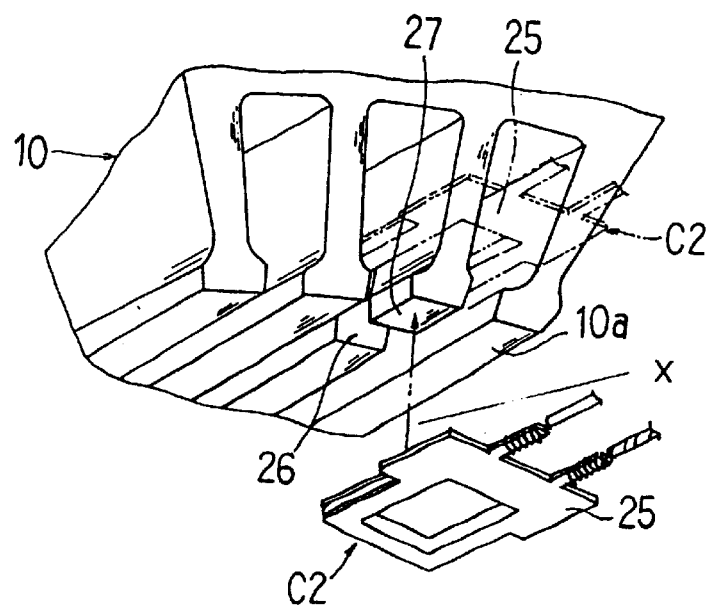

For Example, detection coil C2 is formed on flat bobbin 25 as shown in FIG. 3. Detection coil C2 is embedded and attached to embedding core unit 27 as indicated by arrow x. Detection coil C2 is attached by notch groove 26 of embedding core unit 27 in the end of the stator iron core teeth of stator 10.

Figure 4:
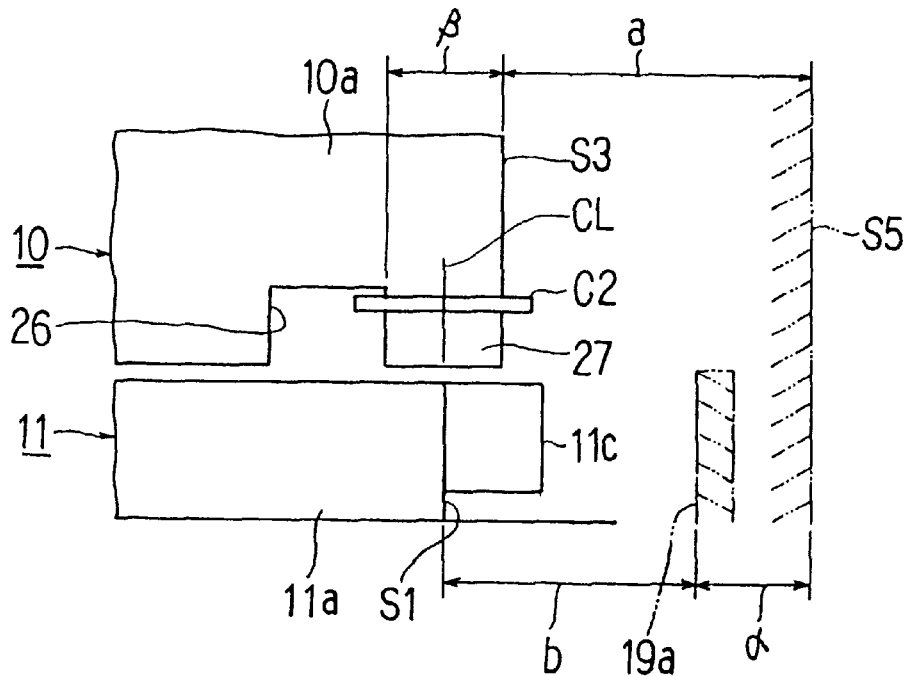
Figure 5:
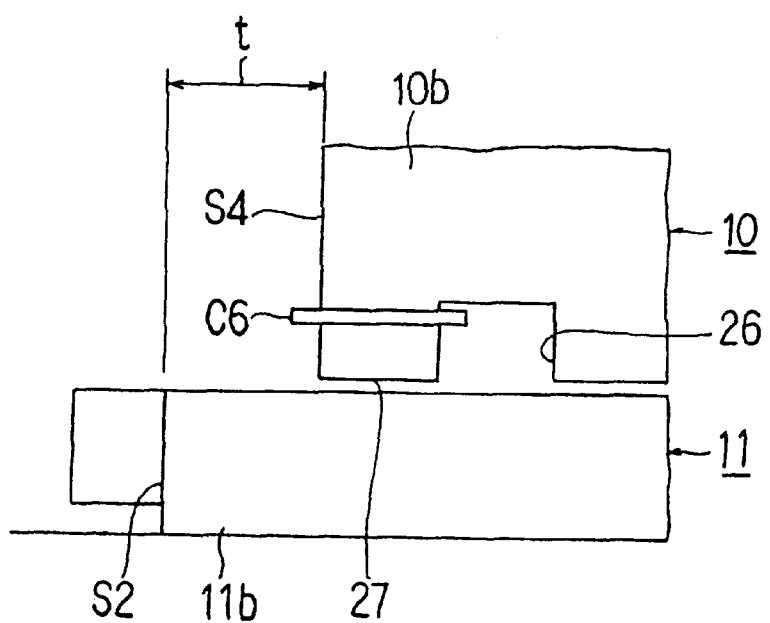

The axial positioning of rotor 11 and the two ends of stator 10, which are attached to detection coils C2, C4, C6, and C8, are set as shown in FIGS. 4 and 5. Referring to FIG. 4, one axial end 10a of stator 10 is set to coincide with one end face S1 at one end 11a of rotor 11. The axial-direction center CL of embedding core unit 27, at axial end 10a of stator 10, is set to coincide with end face S1 of one end 11a of rotor 11. This positioning is set by controlling dimension a, the distance between end face S3 of one end 10a of stator 10 and assembly surface S5 that abuts front bearing housing 4 of canned motor unit 3, and dimension b, the distance between end face S1 of rotor 11 and thrust washer 19a.

Referring now to FIG. 5, the position of the other axial end 10b of stator 10 is set. By setting the length of rotor 11 greater than the length of stator 10 at the other axial end 10b of stator 10, end face S2 is set in a position radially outward from end face S4 of its embedding core unit 27. End face S2 is located at the other end 11b of rotor 11 and is spaced a dimension t away from end face S4. This dimension t is set to a value that does not affect the output voltage of detection coils C6 and C8 embedded in embedding core unit 27 (for example, t is no greater than 25 mm). Hence, a fixed output voltage is output from the series circuit of detection coils C6 and C8.

Figure 6:
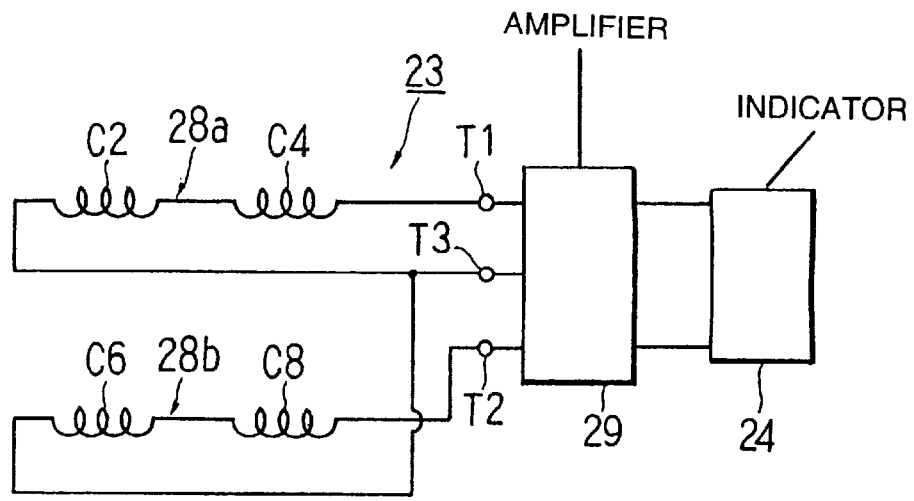

Referring now to FIG. 6, detection circuit 23 is made up of detection coils C2, C4, C6, and C8. Detection circuit 23 includes series circuit 28a, series circuit 28b, and amplifier 29. Series circuits 28a and 28b contain series connected coils C2, C4 and C6, C8 respectively. Amplifier 29 includes a differential amplifier in which the series outputs of these series circuits 28a and 28b are connected via the three output terminals T1–T3. Amplifier 29 provides signal gain to the series circuits 28a and 28b to drive indicator 24.

Figure 8:
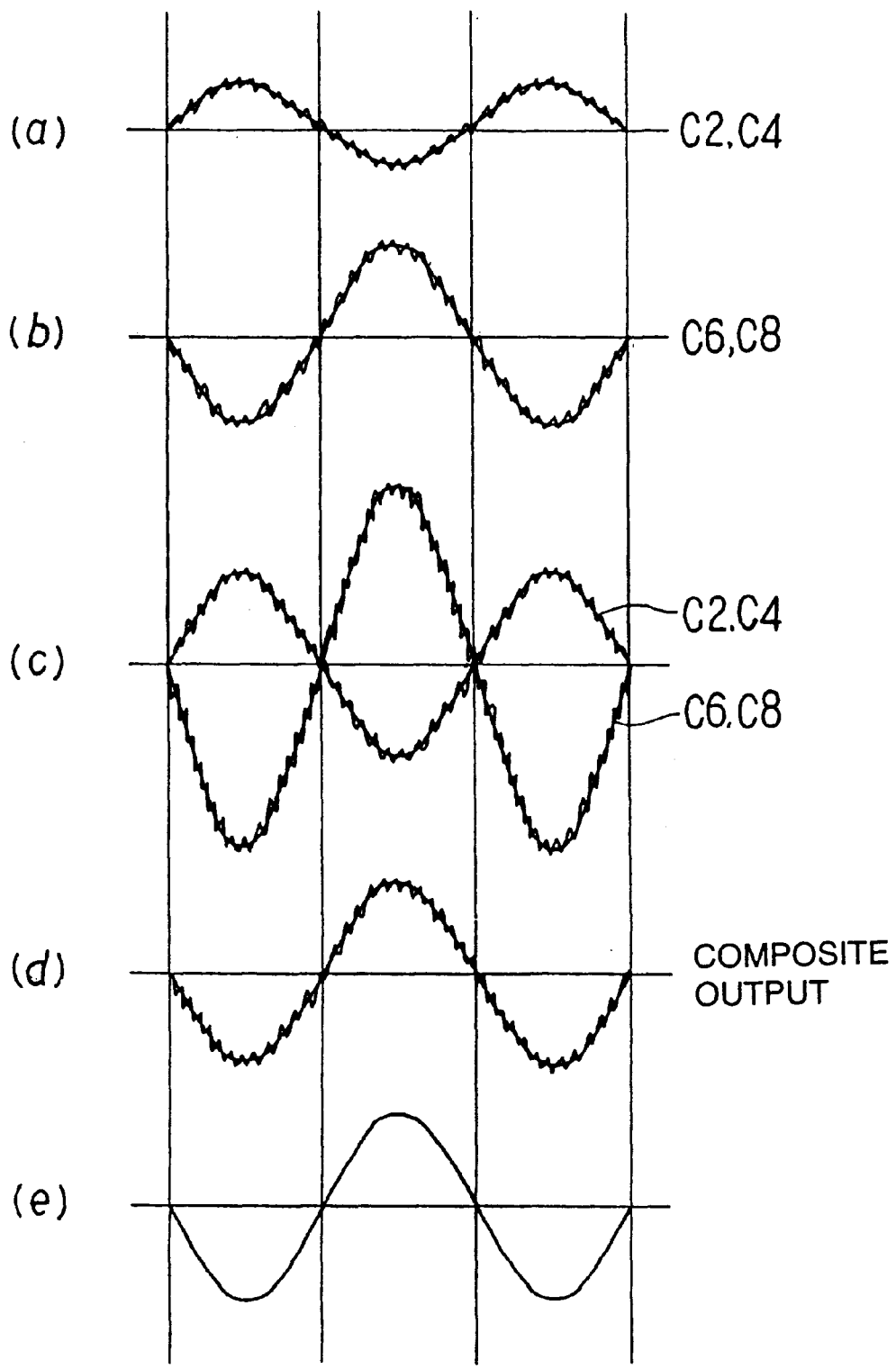
Figure 9:
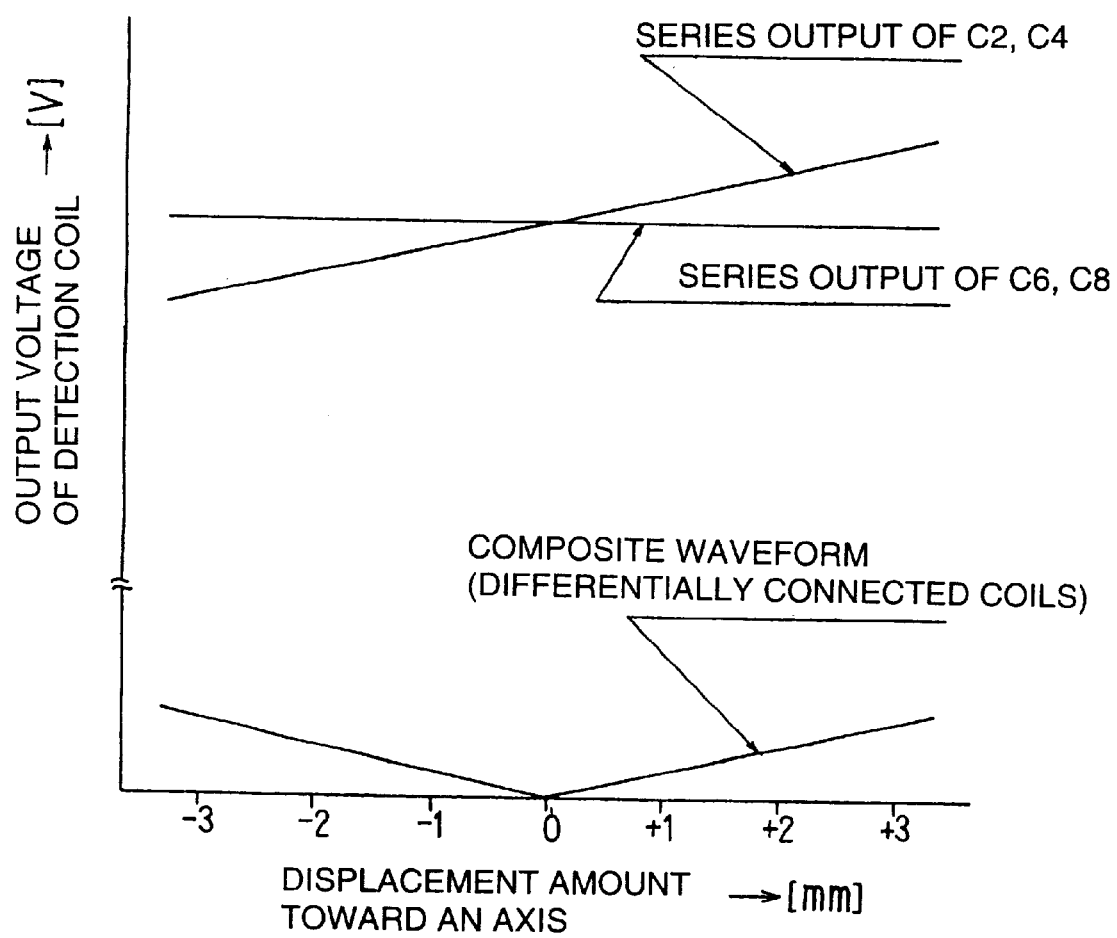
Figure 10:
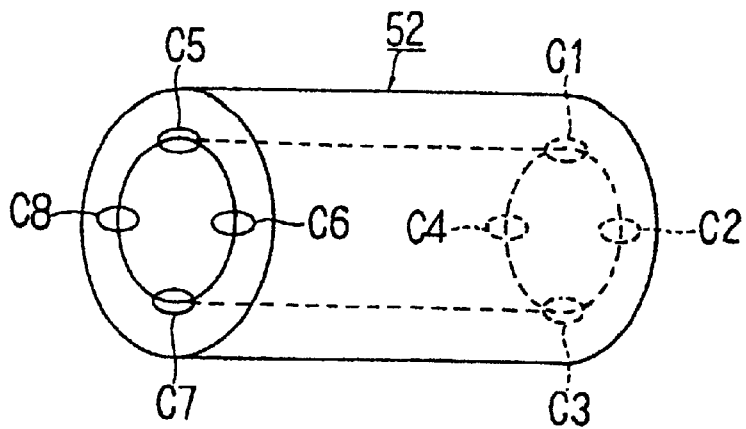
FIG. 10 is a rough perspective view showing the set positions of the detection coils of a canned motor as found in the prior art.
Figure 11:
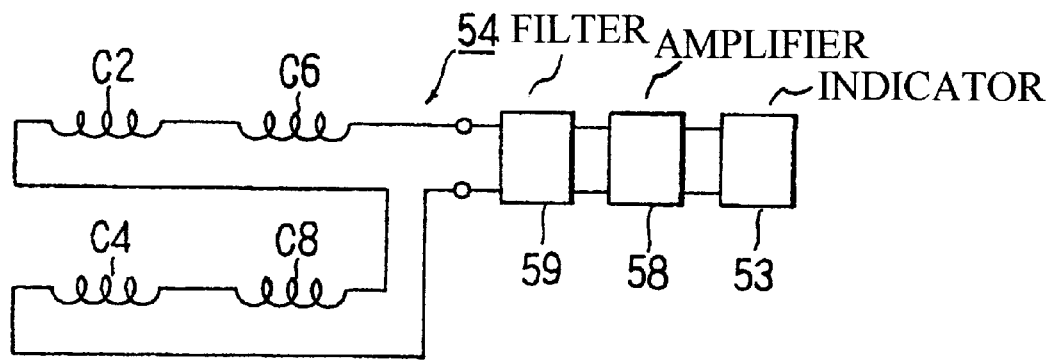
FIG. 11 is a circuit diagram of a detection circuit that detects the displacement of the rotor in the axial direction as found in the prior art.

FIG. 8 shows an example of the voltage waveforms of detection coils C2, C4, C6, C8 from detection circuit 23, when the rotor 11 is displaced axially by 3mm from the stator (see also FIG. 9). FIG. 8 shows:(a) the voltage waveform of detection coils C2 and C4, (b) the voltage waveform of detection coils C6 and C8, C) the output waveform of series circuit 28a (between terminals T1 and T3) and the output waveform of series circuit 28b (between terminals T2 and T3), (d) the composite (differential connection) waveform of series circuits 28a and 28b, and (e) the waveform from which the ripple has been removed by a low-pass filter (not shown). The wear of the bearings in the axial direction is indicated by the composite waveform (d) or (e).

The relationship between the displacement of rotor 11 in the axial direction and the series output of detection coils C2 and C4 and detection coils C6 and C8 is illustrated in FIG. 8. Detection coils C2 and C4 are embedded in embedding core unit 27 at one end 10a of stator 10. The center CL of embedding core unit 27 coincides with end face S1 of stator 11. The series output of detection coils C2 and C4 is directly affected by the position of end face S1 of rotor 11. The output voltage of the detection coils C2 and C4 is shown in FIG. 9 to increase linearly in accordance with displacement of rotor 11 in the axial direction from the minus side to the plus side.

Referring now to FIG. 9, the series output of detection coils C6 and C8 has a constant (unchanging) output voltage, being unaffected by the axial displacement of rotor 11. Detection coils C6 and C8 are embedded in embedding core unit 27 at the other end 10b of stator 10 positioned dimension t on the inner side from the other end 11b of rotor 11. The amount of displacement of detection coils C2 and C4 and of detection coils C6 and C8 in the axial direction is combined by amplifier 29. The output voltage is least when the amount of displacement is zero, and a V-shaped composite (differentially connected coils) waveform is obtained that increases linearly as the amount of displacement moves toward the minus side and toward plus side.

Series circuits 28a and 28b are differentially connected to provide an output signal. The effects of disturbances in detection circuit 23 are minimized by the differentially connected output of this circuit. If there is a disturbance, such as for example a load fluctuation or a voltage fluctuation, the fundamental frequency of the above waveform (the frequency of the power source) rises or falls. The waveforms of detection coils C2, C4, C6, and C8 change respectively due to a disturbance. The effect of the disturbance on the waveforms of detection coils C6 and C8 is kept to a minimum, because only their fundamental level changes, and use is made of the difference with detection coils C2 and C4, which change in the same way as this waveform.

Figure 7:
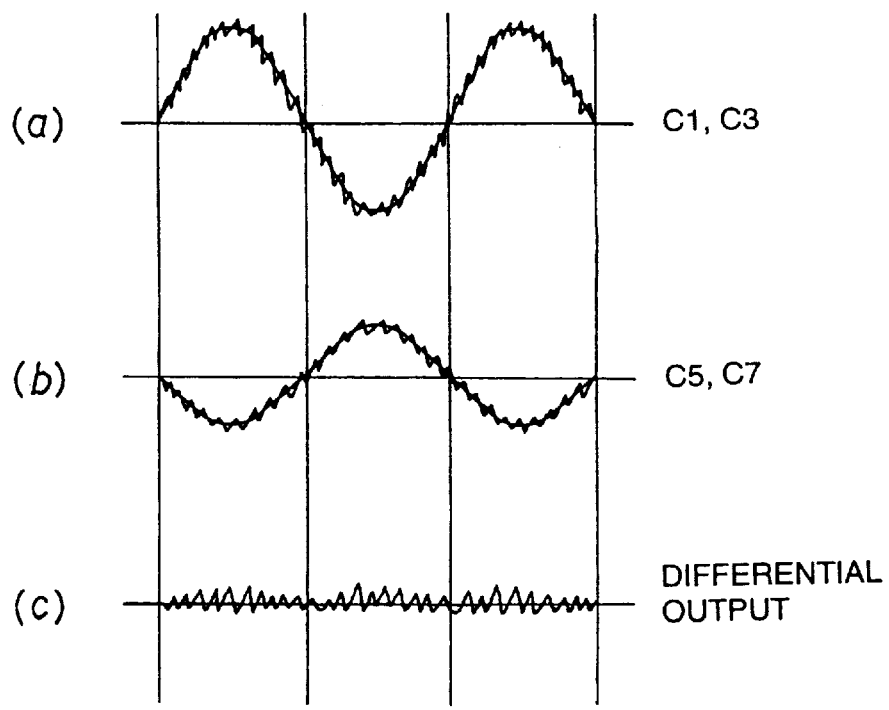
Figure 12:
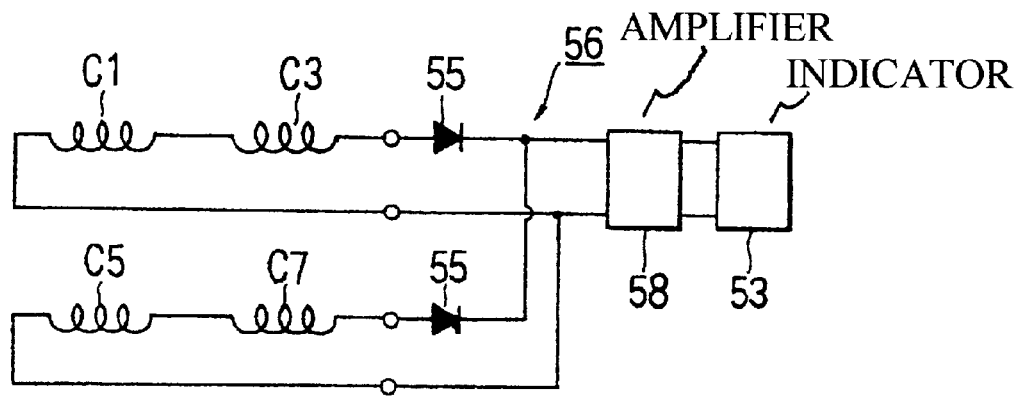
FIG. 12 is a circuit diagram of the detection circuit that detects displacement of the rotor in the radial direction as found in the prior art.
Figure 13:
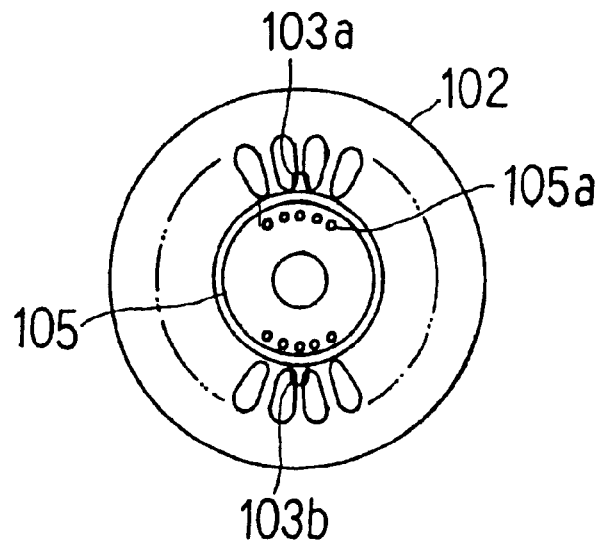
FIG. 13 is an explanatory diagram showing the set positions of the detection coils of a bearing wear monitoring device as found in the prior art.
Figure 14:
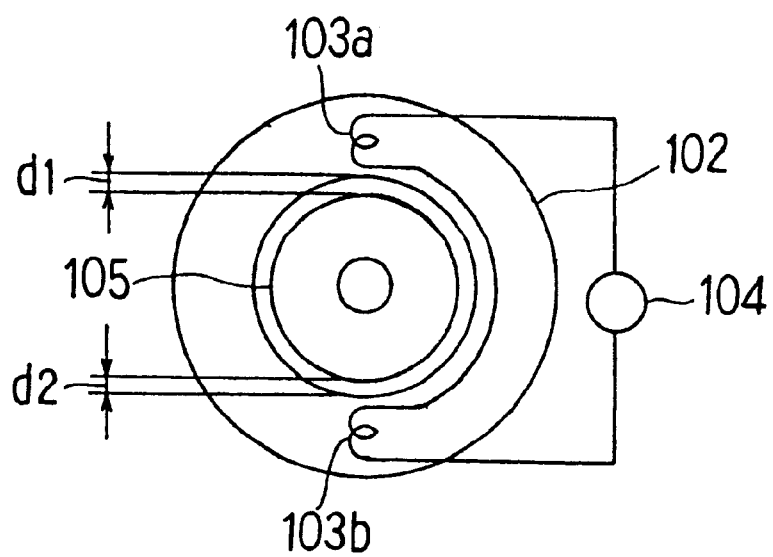
FIG. 14 an explanatory diagram of the prior art detection circuit found in FIG. 13.

Detection coils C1, C3, C5 and C7, which detect the wear of rotor 11 in the radial direction, are connected in the same way as in detection circuit 56 shown in FIG. 12. The waveforms of each of the detection coils C1, C3, C5, and C7 are as shown in FIG. 7. In FIG. 7, (a) shows the voltage waveform of detection coils C1 and C3, (b) shows the voltage waveform of detection coils C5 and C7, and (c) shows the waveform of their differential output. In this detection of displacement in the radial direction, as in the axial direction, the effect of disturbances due to such factors as fluctuations in load or voltage is minimized.

In the above bearing wear monitoring device 18 shown in FIG. 1, it is necessary to replace rotor 11 when damage occurs on the surface of rotor 11 or on rotor shaft 9. For example, if rotor 11 becomes worn, the state of the wear is indicated on indicator 24. When the state of the wear exceeds a preset standard then the rotor 11 must be replaced. To replace rotor 11 of canned motor 1, front bearing housing 4 or impeller 5 of pump unit 2 from canned motor unit 3 must be removed. The rotor assembly, consisting of rotor 11, bearings 12 and 13, and thrust washers 19a and 19b, is removed from the canned motor unit 3, replaced with a new rotor, followed by attaching pump unit 2.

In replacing the rotor 11, the aforesaid dimension b between end face S1 of one end 11a of rotor 11 of the rotor assembly and thrust washer 19a is controlled and set to the prescribed value. Dimension a between end face S3 of one end 10a of stator 10 and assembly surface S5 is also controlled so that dimension α in FIG. 4 is set to the prescribed value. Thus, end face S1 of rotor 11 can be positioned to center CL of core embedding unit 27 of stator 10.

Width β of embedding core unit 27 and dimensions a and b are predetermined. The position of rotor 11 of the new replacement rotor assembly is set so as to satisfy the equation α=a−b+(β/2). The replacement of the rotor 11 is complete once the rotor assembly is assembled into canned motor unit 3, and end face S1 of rotor 11 is aligned to coincide with center CL of embedding core unit 27.

The above described procedure can be followed when a worn stator 10 is to be replaced, or when a worn stator 10 and rotor 11 are both to be replaced. The standard surfaces for controlling the dimensions of end face S3 of stator 10 and end face S1 of rotor 11 are not limited to the aforesaid assembly surface S5 and thrust washer 19a. Other suitable standard surfaces can be selected.

In canned motor 1 of the above embodiment, the positioning of stator 10 and rotor 11 in the axial direction can be easily done. The adjustment of the zero point of bearing wear monitoring device 18 in the axial direction, can be accomplished by aligning center CL of embedding core unit 27 at one end 10a of stator 10 to coincide with end face S1 of one end 11a of rotor 11. By positioning the other end 11b of rotor 11 outside the other end 10b of stator 10 by dimension t, the output of detection coils C6 and C8 on the other end 10b of stator 10 are made constant (unchanging). The operation of doing zero-point adjustment can be done very simply because it is possible to do positioning and zero-point adjustment just with detection coils C2 and C4 on the one end 10a. In summary, the operation of replacing a worn stator 10 or rotor 11 can be performed easily, the operation of positioning stator 10 and rotor 11 in the stage of manufacturing canned motor 1 can be performed easily, and the case of assembly can be improved.

The effect of disturbances such as load fluctuations or voltage fluctuations can be minimized by use of the differential output of series circuits 28a and 28b where the output of detection circuit 28b is kept unchanged (constant) regardless of the displacement of rotor 11 in the axial direction. The state of wear in the axial and radial directions can be detected with high precision by this method. As a result, the state of wear of the bearings can be accurately indicated on indicator 24 of bearing wear monitoring device 18. Unwanted occurrences, such as missing the replacement time and causing damage to canned motor 1, can thus be avoided.

Moreover, because the state of wear in the axial direction can be detected by detection coils C2, C4, C6, and C8, and the state of wear in the radial direction and obliquely can be detected by detection coils C1, C3, C5, and C7, non-directional wear of the bearings can be detected. The state of wear of the bearings can be reliably monitored even in the case of canned motor 1, in which the direction of the load on rotor 11 and rotor shaft 9 changes depending on the nature and pressure of the fluid that is being transported.

In addition, because detection coils C1–C8 are formed by winding wires around thin bobbin 25, detection coils are obtained that are superior in mechanical strength, and protected by bobbin 25. Stator 10 can be attached to embedding core unit 27 in a one-touch operation, and the operation of attachment and replacement can be done easily.

In the above embodiment, positioning is done at one end 10a and 11a of stator 10 and rotor 11, and the other end 11b of rotor 11 is positioned protruding on the outside from end face S4 of the other end 10b of stator 10. However, this invention is not limited to this composition; the reverse composition may also be used, in which positioning is done at the other end 10b and 11b of stator 10 and rotor 11.

In the above embodiment, detection coils in which windings are wound on bobbin 25 are used as detection coils C1–C8. However, detection coils could be used where the windings are simply wound in a ring shape. It will be recognized by one skilled in the art that other shaped detection coils could easily be used.

It will be recognized by one skilled in the art that the above disclosure is equally applicable to other forms of motors that require monitoring of the wear of the bearings, and is not limited to the canned motor described herein. The specific internal structure of canned motor 1 in the above embodiment is one example, and various modifications can be made so long as they do not deviate from the substance of this invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A bearing wear monitoring device for use in a motor, comprising:

a stator having a first axial end and a second axial end;

detection coils provided on each of said first axial end and said second axial end of said stator;

said detection coils effective to provide an output signal;

means for detecting said output signal;

a rotor having a rotor shaft with a front portion and a rear portion;

said front portion and said rear portion of said rotor shaft being supported by a front bearing and rear bearing, respectively;

said rotor being in a predetermined position within said stator;

said predetermined position resulting in a prescribed spacing between said rotor shaft and said stator, such that said output signal of said detection coils is effective to indicate an amount of displacement from said prescribed spacing.

2. A bearing wear monitoring device for use in a motor as in claim 1, further comprising:

said rotor having a first axial end and second axial end;

an embedding core unit provided at each of said first axial end and said second axial end of said stator;

said detection coils being provided in said embedding core units at each axial end of said stator;

said first axial end of said rotor being positioned such that said first axial end of said rotor is positioned in a prescribed position relative to said first axial end of said stator; and said second axial end of said rotor being positioned such that said second axial end of said rotor is positioned a prescribed distance outside of said embedding core unit of said second axial end of said stator.

3. A bearing wear monitoring device for use in a motor, comprising:

a stator having a first axial end and a second axial end;

at least one pair of first detection coils connected in series being provided on said first axial end of said stator;

each of said at least one pair of first detection coils facing each other with a separation of 180 degrees;

said at least one pair of first detection coils effective to produce a first output signal;

at least one pair of second detection coils connected in series being provided on said second axial end of said stator;

each of said at least one pair of second detection coils facing each other with a separation of 180 degrees;

said at least one pair of second detection coils effective to produce a second output signal;

means for maintaining one of said first output signal and said second output signal at a constant value;

said at least one pair of first detection coils and said at least one pair of second detection coils being connected differentially to provide a differential output signal;

means for detecting said differential output signal;

a rotor having a rotor shaft;

said rotor shaft being supported by at least one bearing;

said rotor being in a predetermined position within said stator;

said predetermined position resulting in a prescribed spacing between said rotor shaft and said stator, such that said differential output signal indicates an amount of relative displacement from said prescribed spacing.

* * * * *